Figure 3:
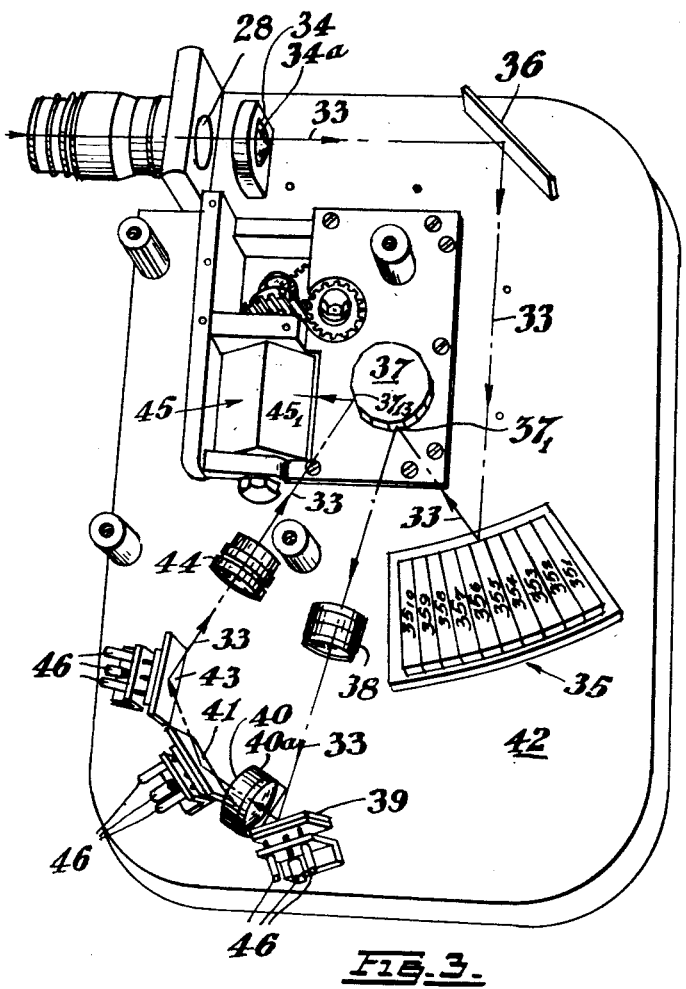

Aug. 24, 1954       K. M. BAIRD       2,687,062
HIGH-SPEED CAMERA
Filed Jan. 30, 1950       4 Sheets-Sheet 1
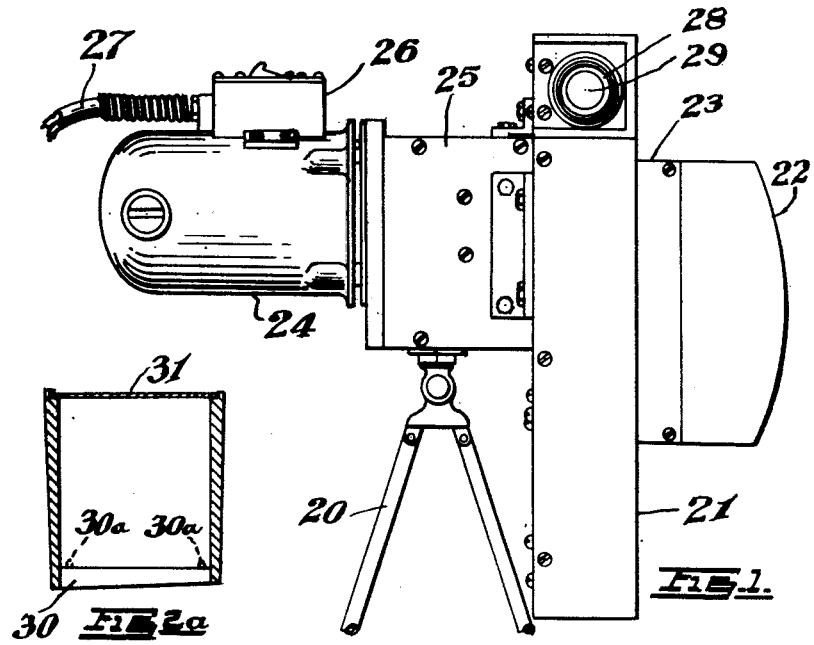
FIG. 1.
FIG. 2a.
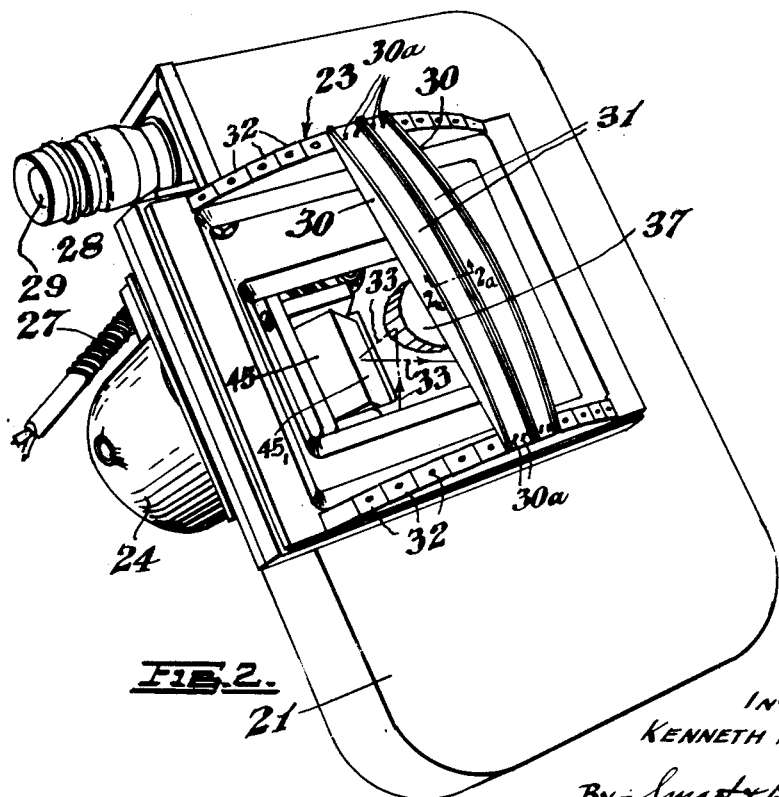
FIG. 2.
INVENTOR
KENNETH M. BAIRD
By Smart & Biggar
ATTORNEYS.

Aug. 24, 1954     K. M. BAIRD     2,687,062
HIGH-SPEED CAMERA
Filed Jan. 30, 1950     4 Sheets-Sheet 3
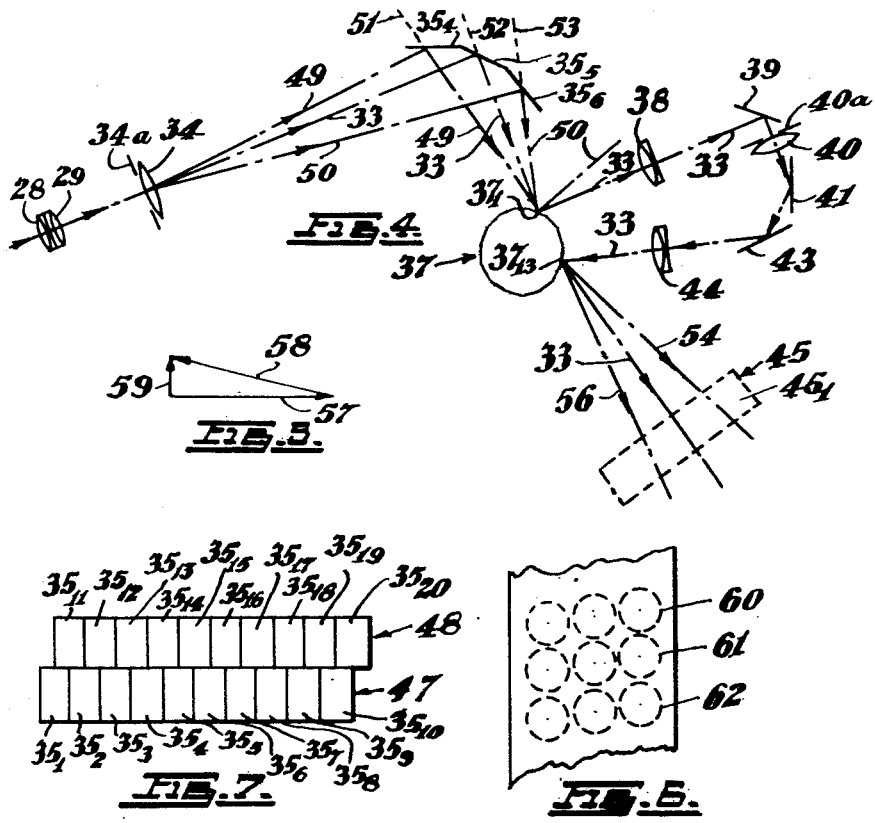
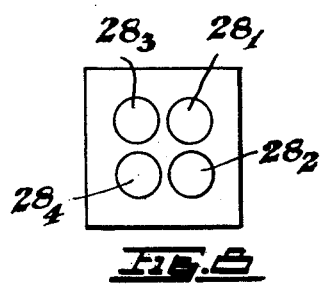
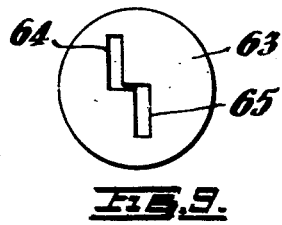
INVENTOR
KENNETH M. BAIRD
By Smart y Biggar
ATTORNEYS.

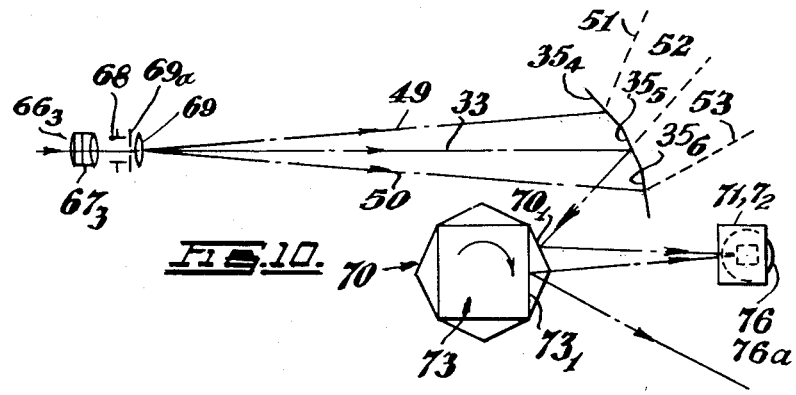
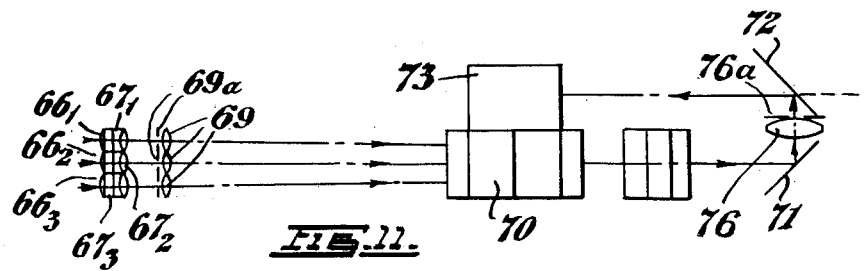
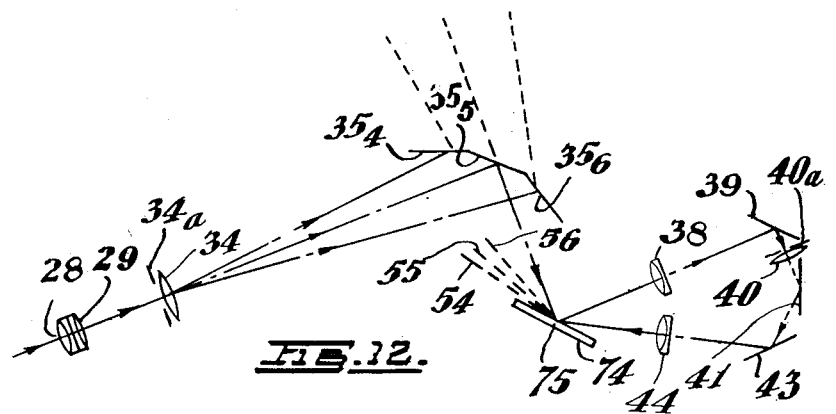

Patented Aug. 24, 1954

2,687,062

UNITED STATES PATENT OFFICE 2,687,062

HIGH-SPEED CAMERA

Kenneth M. Baird, Ottawa, Ontario, Canada, assignor to The Honorary Advisory Council for Scientific and Industrial Research, Ottawa, Ontario, Canada, a body corporate of Canada Application January 30, 1950, Serial No. 141,330

Claims priority, application Canada March 10, 1949

13 Claims. (Cl. 88—16)

The invention relates to cameras, and in particular to high speed cameras for taking a large number of consecutive photographs of an event at a high rate, for example, a rate of 50,000–250,000 or higher photographs per second.

Prior to the invention there have been proposals for building cameras capable of rates as high as 500,000 photographs per second, and even upwards of 11,000,000 photographs per second are proposed, but the prior proposals, from a practical standpoint, have had the disadvantage that a camera built according to them was difficult and expensive to build and operate due to the necessity of light from the object to be photographed entering the camera through a plurality of adjacent objective lenses. A high speed shutter had to be used to scan the objective lenses successively and, if more photographs were to be obtained than the number of objective lenses, the shutter was required repeatedly to scan the objective lenses successively while the film was required to be moved in synchronism with the shutter. Apparatus designed to embody these prior proposals, besides having a good many expensive objective lenses, was usually heavy and cumbersome due to the strong construction required to withstand the high centrifugal forces set up in the camera by the rotating parts. The weight of such a camera according to the prior proposals usually made it impractical to adjust the position of the camera in respect to the position of the object to be photographed with the result that it was necessary to locate the object to suit the fixed position of the camera. Other high speed cameras have been proposed but the results suffer from lack of definition and are therefore not satisfactory.

A camera embodying the present invention overcomes the disadvantages of the prior art and may be of a suitable size and weight to be mounted on a tripod for use in the manner of a conventional motion picture camera. In accordance with the invention, a camera comprises an objective aperture for admitting light from an object to be photographed, a plurality of image forming elements arranged to be flooded with light from the objective aperture and to form a series of adjacent virtual images of the object, a rotatable light reflecting surface arranged to reflect light from each of the virtual images and to form a series of remote moving virtual images, means for rotating the reflecting surface, an image forming element located to transmit light consecutively from the moving virtual images to form a series of moving real images of the object at a location remote from the rotatable light reflecting surface, and means for recording the real images one at a time on photographic film. Preferably the image forming elements are a series of edgewise adjacent plane mirrors so angularly disposed to each other that the virtual images formed by them are substantially contiguous. The rotatable light reflecting surface may be a light reflecting element in the form of a rotatable reflecting surface such as a prism, mirror, etc. Real images are projected individually and successively to the film as the reflecting surface is rotated and, in a preferred arrangement, the optical system is arranged to direct the real images to the rotatable reflecting surface so that they are projected from the rotatable reflecting surface. After the second projection of the images from the rotatable reflecting surface, the real images are directed to the film. Movement of the real images caused by movement of the reflecting surface during the reflection of light from the virtual images can be effectively cancelled by the second projection of the images with the result that stationary film may be used.

A camera according to the invention can be made capable of taking a large number of consecutive photographs at high speed by having the rotatable reflecting surface in the form of a reflecting prism rotatable about a central axis parallel to the reflecting sides of the prism so that each side of the prism will repeat the successive projection of each virtual image of the series of adjacent virtual images. To prevent each series of images from overlying one another on the film, the film can be moved or, as preferred according to the invention, stationary film can be used by having a second rotatable prism and by having the optical system for directing the images arranged to rotate the images a predetermined amount in a predetermined direction about their optical axes before reflection from the second rotatable prism to the stationary film.

The means used in the optical system for rotating the images a predetermined amount in a predetermined direction may be two mirrors for reflecting the images one to the other and having the planes of their reflecting sides inclined predetermined amounts in opposite directions relative to the axis of the rotatable reflecting prism for reflecting the images from the series of fixed mirrors to the optical system.

By using a plurality of series of fixed mirrors arranged in tiers with the mirrors in each tier offset from the mirrors in each other tier, the speed of the camera can be increased in proportion to the number of tiers used.

The invention will be further described by reference to the attached drawings which illustrate certain embodiments of it, and in which Figure 1 is a front view of the outside of a camera according to the invention, Figure 2 is a perspective side view of the camera shown in Figure 1 with the film magazine cover and some of the film holders removed, Figure 2a is a cross section of a film holder taken on the line 2a—2a in Figure 2, Figure 3 is a perspective plan view of the optical arrangement of the camera shown in Figures 1 and 2, Figure 4 is a diagrammatic representation of an optical arrangement for a high speed camera according to the invention as shown in Figure 3, Figure 5 is a vector diagram referred to in describing Figure 4, Figure 6 is a diagrammatic representation of the relative positions of photographs obtained by a camera according to the invention having moving film and an optical arrangement similar to the one shown in Figure 4, Figure 7 is a diagrammatic representation of a plurality of series of mirrors in tiers for forming a series of adjacent virtual images, Figure 8 is a diagrammatic representation of a plurality of objective lenses, Figure 9 is a diagrammatic representation of a field stop suitable for use with the lens arrangement shown in Figure 8, Figure 10 is a diagrammatic representation in plan of an optical arrangement with a plurality of objective lenses for a high speed camera according to the invention, Figure 11 is a diagrammatic representation in elevation of the optical arrangement shown in Figure 10, and Figure 12 is a diagrammatic representation in plan of an optical arrangement with a single rotatable reflecting surface for a high speed camera according to the invention.

In Figure 1 a complete camera according to the invention is mounted on a tripod 20 ready for taking high speed photographs of an object. The camera comprises a light tight housing 21 for the optical arrangement of the camera, a cover 22 for the film magazine 23, an electric motor 24 and a gear box 25 connecting the motor 24 to the housing 21. A switch 26 is mounted at the top of the motor 24 and is used to connect the motor to a suitable source of electricity through an electric cable 27. At the front of the housing 21 there is an objective aperture 28 having objective lens arrangement 29. The camera is adapted to be pivoted on the tripod 20 in the same manner as a conventional low speed motion picture camera.

Figure 2 shows a perspective side view of the camera with the light tight cover 22 (Figure 1) and some of the film holders 30 removed showing part of the optical arrangement of the camera. As shown strips of 16 mm. film 31 are held in the film magazine 23 by the individually removable film holders 30. The film holders 30 are curved outwardly to equalize the distance of all parts of the strips of film 31 from the source of light for exposing the film from within the optical arrangement of the camera. As shown in Figure 2, the curved ends of the film magazine 23 have flats 32 with tapped holes for mounting the film holders 30. The film holders 30 are mounted at a slight angle to the sides of the film magazine 23 for a reason that will be explained below in connection with the operation of the camera. As shown in Figure 2a, the film strips 31 are seated in grooves along the upper edges of the film holders 30 and the ends of the film are held by pins 30a at the ends of the film holders 30.

The optical arrangement of the camera is shown in a perspective plan view in Figure 3 with the housing 21 and the film magazine 23 removed from the camera. A broken line 33 is used to indicate the path followed from the objective aperture 28 to the film 31 by the light required to form at the film a single image of the object to be photographed. The light enters the optical arrangement through the objective aperture 28 and the objective lens 29 (Figure 2) and follows the path indicated by the broken line 33 through a field lens 34 and its field stop 34a. The light is then reflected by a mirror 36 and floods a series of edgewise adjacent fixed mirrors 35 which are individually marked $35_1$, $35_2$ ... $35_{10}$. A single light path is shown to the mirror $35_5$ as an example although it is to be understood that each of the mirrors 35 simultaneously reflects a virtual image of the object to be photographed to a rotatable reflecting prism 37 having 15 reflecting sides $37_1$, $37_2$ ... $37_{15}$ and having its axis of rotation parallel to the planes of the reflecting faces of the mirrors 35. The mirrors 35 are rectangular in cross section and having long sides butting against each other. The sides of the mirrors 35 are so sloped that when the series of mirrors are mounted as shown, the reflecting face at the end of each mirror 35 is in a position to reflect an image from the mirror 36 to one side of the prism 37, for example, the side $37_1$ with the prism 37 in the position shown in Figure 3. The light is reflected from the reflecting side $37_1$ of the rotatable reflecting prism 37 through an objective lens 38 to a mirror 39 which reflects the light through a field lens 40 to a mirror 41. The objective lens 38 forms a real image at the field lens 40. The lens 40 has a field stop 40a to limit its field to approximately that of a single real image. The light is reflected from the mirror 41 to a mirror 43 and thence through an objective lens 44 to the reflecting side $37_{13}$ of the rotatable reflecting prism 37. The reflecting side $37_{13}$ reflects the light to a second rotatable reflecting prism 45 and the light is reflected from a reflecting side $45_1$ of the reflecting prism 45 to an appropriate strip of film 31. The light path 33 from the rotatable prism 37 to the second rotatable prism 45 is also shown in Figure 2 and, from this figure, it can be seen how the light is reflected from the second rotatable prism 45 to a strip of film 31.

The series of edgewise adjacent fixed mirrors 35 are so angularly disposed to each other and so positioned relative to the direction of light from the objective aperture 28 as reflected by the mirror 36 and to the reflecting prism 37 that a virtual image of the object to be photographed as formed by the light entering the objective aperture 28 may be reflected individually and simultaneously by each of the mirrors $35_1$, $35_2$ ... $35_{10}$ to the reflecting side $37_1$ of the reflecting prism 37. Mirror 36 may be replaced by a number of mirrors or the arrangement may be such that the mirror 36 is omitted and the path of light from the objective aperture 28 to the mirrors 35 is direct.

As shown in Figure 3 the axis of rotation of the rotatable prism 37 is perpendicular to the base 42 on which the optical arrangement is mounted.

The planes of the reflecting surfaces of the mirrors 41 and 43 are so adjusted by the adjusting screws 46 that they are slightly inclined in different directions to the axis of the rotatable reflecting prism 37. The mirror 39 is also adjustable by adjusting crews 46 so that it can be given a proper angle for reflecting light from the lens 38 through the lens 40 to the mirror 41.

The mechanical arrangements for driving the rotatable parts of the camera are not shown in detail since they consist of well known arrangements for transferring the driving power of the electric motor 24 through the gear box 25 to the two rotatable prims 37 and 45. As an example the motor 24 may be a 1 H. P., 20,000 R. P. M., series wound universal motor arranged to drive the rotatable prism 37 at 100,000 R. P. M. and the second rotatable prism 45 at 20,000 R. P. M. With these speeds of rotation and ten angularly disposed mirrors $35_1$, $35_2$ . . . $35_{10}$ as shown in Figure 3 the camera can take photographs at the rate of 250,000 per second. By having two series of edgewise adjacent fixed mirrors arranged in two tiers 47 and 48 as shown in Figure 7 with the individual mirrors $35_{11}$, $35_{12}$ . . . $35_{20}$ in the upper tier 48 offset in relation to the individual mirrors $35_1$, $35_2$ . . . $35_{10}$ in the lower tier 47, the speed of the camera would be 500,000 photographs per second.

The objective aperture 28 may be fitted with a shutter (not shown) of well known design to control admission of light to the camera. The shutter may be equipped with a timer to automatically close the shutter as soon as the desired number of photographs have been obtained, or in the case of photographing very short events which produce enough light for film exposure, the aperture 28 may be left open for the duration of the event. If the event does not produce enough light for film exposure, electric discharge or flash bulbs may be used to give a short, intense flash of light.

The operation of the camera will now be described with reference to Figures 2, 3 and 4. As shown in Figures 3 and 4, light from the object to be photographed enters the camera through the objective lens 29 in the objective aperture 28 along the path indicated by the broken line 33. The objective lens 29 forms a real image of the object to be photographed at the field lens 34, and the field lens 34 floods the series of edgewise adjacent mirrors $35_1$, $35_2$ . . . $35_{10}$ (Figure 3) with light from the real image formed at the field lens 34. The field stop $34a$ at the field lens 34 prevents extraneous light from passing through the field lens 34. In Figure 4 only part of the series of edgewise adjacent mirrors 35 are shown, namely $35_4$, $35_5$ and $35_6$, and supplementary broken lines 49 and 50 are used to indicate the paths of light from the field lens 34 to the mirrors $35_4$ and $35_6$ respectively. The series of edgewise adjacent mirrors are so angularly disposed to each other and so positioned that they form a series of adjacent virtual images at locations in the directions indicated by the dotted lines 51, 52 and 53 for the mirrors $35_4$, $35_5$ and $35_6$ respectively as shown in Figure 4. Each mirror of the series of mirrors 35 simultaneously reflects a virtual image of the object to be photographed to the rotatable prism 37 as indicated in Figure 4 by the continuations of the broken lines 49, 33 and 50 from the faces $35_4$, $35_5$ and $35_6$ respectively. With the rotatable prism 37 in the position shown in Figure 4, the continuations of the lines 49, 33, 50 converge at side $37_1$ of the rotatable prism 37, and a second series of virtual images is formed by the prism 37. With the prism 37 in the position shown in the figure, the face $37_1$ happens to be in a position which reflects a virtual image along the broken line 33 through the objective lens 38 to the mirror 39. Virtual images reflected from the other mirrors of the series of mirrors 35 also form virtual images behind the face $37_1$, but since they are reflected at different angles from the angle of reflection of light along the broken line 33 they diverge from the broken line 33 as it passes through the lens 38 to the mirror 39. Due to this divergence of the lines 49 and 50, only the light following the broken line 33 is reflected by the mirror 39 through the field stop $40a$ to form a real image at the field lens 40. The aperture in the field stop $40a$ has an area large enough to pass one image only at a time.

Since, during operation of the camera, the rotatable prism 37 is being rotated, images following the broken lines 49, 33 and 50 will successively in that order pass through the field stop $40a$ and therefore images of the object to be photographed are reflected at the mirror 41 singly and successively. Each image as it is reflected at the mirror 41 is reflected by the mirror 43 through the objective lens 44 to another side $37_{13}$ of the rotatable prism 37. Side $37_{13}$ reflects the images towards the second rotatable prism 45 and, since side $37_{13}$ is being rotated, each image is reflected in a slightly different direction from that of the immediately preceding image. The broken lines 54, 33 and 56 running from the side $37_{13}$ toward the second rotatable prism 45 are used to indicate the directions of reflection of three successive images from the side $37_{13}$.

As mentioned above the mirrors 41 and 43 are slightly inclined in opposite directions relative to the axis of the rotatable prism 37 so that during reflection by the mirrors 41 and 43 each successive image is rotated about its opical axis an amount depending upon the degree of inclination of the mirrors 41 and 43. Therefore, the images reaching side $37_{13}$ of the rotatable prism 37 have been rotated a predetermined amount from the position in which they are reflected from the side $37_1$ and the motion imparted to the images by the side $37_{13}$ does not completely cancel out the motion imparted to the images by the side $37_1$. In terms of displacement, the displacement of an image by the side $37_{13}$ is equal in amount to the displacement of the same image by the side $37_1$, but due to rotation of the image by the mirrors 41 and 43 there is a slight difference in direction of the displacements and, as a result, the image is moved a small amount in a direction at right angles to its displacement by the side $37_1$. The relation of these displacements is shown vectorially in Figure 5 in which a vector 57 represents displacement of an image caused by rotation of the side $37_1$, and a vector 58 represents the displacement caused by the side $37_{13}$. The angle between the vectors 57 and 58 is determined by the amount the images are rotated by the mirrors 41 and 43, and the vector 59 represents the resultant displacement of each image as it leaves the face $37_{13}$. Since the images leaving the face $37_{13}$ are being displaced in an upward direction as shown by the vector 59, film moving in the same upward direction and at the same speed as the images could be used to obtain photographs of the images as they are formed in positions near the position of the second rotatable prism 45 as shown in Figure 4 by dotted line. The film should be moved at the same speed as that of the upward displacement of the images. With moving film the pattern of photographs obtained on the film would be similar to that shown in Figure 6 in which the positions of three successive rows 60, 61 and 62 of images (in dotted line) are shown. The images along each of the rows 60, 61 and 62 are formed by light arriving along the paths indicated by the broken lines 54, 33 and 56.

Since it is usually preferred not to have moving film in a camera of this type, the second rotatable prism 45 may be used and the film may then be in the stationary holders 30 as shown in Figures 2 and 2a. As indicated in Figures 2 and 3, and by dotted line in Figure 4, the axis of the second rotatable prism 45 is at right angles to the axis of the rotatable prism 37, and the sides of the rotatable prism 45 are adapted to reflect images arriving in the direction of the lines 54, 33 and 56 to the film 31 in the holders 30. The direction of rotation of the second rotatable prism 45 is such that the sides of the prism 45 are moving in a direction opposed to the direction of displacement of the images as indicated by the vector 59 in Figure 5. The speed of rotation of the second rotatable prism 45 is equal to the speed of displacement of the images being reflected so that their motion is substantially eliminated and the images appearing at the film 31 are stationary. Each series of successive images formed along a side, for example the side $45_1$, of the prism 45 is reflected by a single strip of film 31 and since rotation of the side $45_1$ causes each successive image formed on the side 45, to be reflected from the side $45_1$ in a slightly different direction to the immediately preceding image, the images are reflected into the film magazine 23 in rows making a slight angle with the axis of rotation of the second rotatable prism 45. By mounting the film holders 30 at the same angle to the axis of the second rotatable prism 45. By mounting the film holders 30 at the same angle to the axis of the second rotatable prism 45 as the angle of the rows of images, the images form rows of exposures along the centre of each strip of film 31, and each successive row of images is received on the next strip of film 31 in the direction of rotation of the second rotatable prism 45. The speed of rotation of the second rotatable prism 45 is so related to the speed of rotation of the rotatable prism 37 that a single side of the prism 45 is used to reflect images to all the strips of film 31.

Instead of the single tier of edgewise adjacent mirrors 35 as shown in Figure 3, and diagrammatically indicated in Figure 4, a plurality of tiers of mirrors could be used as shown in Figure 7. In Figure 7 two tiers 47 and 48 are shown, the tier 47 corresponding to the tier shown in Figure 3 and indicated in Figure 4, while the tier 48 is an additional tier in which the individual mirrors $35_{11}, 35_{12}, \ldots 35_{20}$ are offset in relation to the individual mirrors in tier 47. With this arrangement of the mirrors 35, the optical arrangement of the camera would operate in a similar manner to that described in connection with Figures 3 and 4 with the exception that the picture rate of the camera would be doubled. With the double tier arrangement of the mirrors 35, the images passing through the field stop $40a$ of the lens 40 would be reflected in succession from the mirrors 35 in the following order $35_1, 35_{11}, 35_2, 35_{12}, 35_3, 35_{13}, \ldots 35_{10}, 35_{20}$. In this arrangement an image of the object to be photographed is reflected individually by each of the mirrors $35_1, 35_2, \ldots 35_{20}$ to a reflecting side of the reflecting prism 37, in the case of the diagram shown in Figure 4, side $37_1$.

The speed of the camera can be further increased by using a plurality of objective apertures $28_1, 28_2, 28_3$ and $28_4$ as shown in Figure 8 and which may be individually fitted with objective lenses. With the arrangement of four objective apertures as shown in Figure 8, the field stop used in connection with the field lens 40 as shown in Figure 4 should be of the type shown in Figure 9. In the field stop 63 shown in Figure 9, there are two apertures 64 and 65. The vertical distance between the centres of the apertures 64 and 65 should be the same as the vertical distance between the centres of the objective apertures $28_1$ and $28_2$ or $28_3$ and $28_4$. The horizontal distance between the centres of the apertures 64 and 65 should be approximately equal to one-half the horizontal distance between the objective apertures $28_1$ and $28_3$ or $28_2$ and $28_4$. With an arrangement of objective apertures as shown in Figure 8 in place of the single aperture 28 shown in Figure 4, a pattern of four images of the object to be photographed will be formed by the objective apertures $28_1 \ldots 28_4$ at the field lens 30 and each of the mirrors $35_1, 35_2, \ldots 35_{10}$ will form the same pattern of images which will in turn be reflected to a single side of the rotatable prism 37. It is pointed out, however, that the vertical and horizontal distances mentioned above in connection with the field stop 63 depend on the size of the images that are formed at the field stop 63 and are not necessarily the size shown in the drawings. As explained above the rotation of the rotatable prism 37 causes the light reflected by each of the mirrors 35 to pass across the field stop $40a$ in succession. With the field stop $40a$ removed and the field stop 63 in its place, during the passing of each pattern of images as formed by the objective apertures $28_1 \ldots 28_4$ across the field stop 63, the image formed by the aperture $28_1$ will pass through the aperture 64 of the field stop 63 and then due to the staggering of the apertures 64 and 65 the image formed by aperture $28_1$ will be blocked and the image formed by the aperture $28_2$ will pass through the aperture 65. In a similar manner images formed by the apertures $28_3$ and $28_4$ will follow the images formed by the apertures $28_1$ and $28_2$ singly in succession. With this arrangement of four objective apertures, four images are formed at the film in succession during the same time interval as a single image would be formed at the film by a single objective aperture as shown in Figure 4 and consequently the speed of the camera is quadrupled.

In another embodiment of the invention, the speed of a camera as described in connection with Figures 1 to 4 can be increased several fold by an optical arrangement as indicated diagrammatically in Figures 10 and 11. Figure 10 is a diagrammatic view in plan of an optical arrangement for the embodiment, and Figure 11 is a diagrammatic view in elevation of the optical arrangement shown in Figure 10. A plurality of objective apertures, say ten or fifteen, of which only three $66_1, 66_2$ and $66_3$ are shown in the figures for the sake of clarity, are each fitted with an objective lens $67_1, 67_2, 67_3$ respectively. The objective apertures 66 are adapted to be exposed individually in quick succession by means of Kerr cells 68 operated by well known electronic means (not shown). A Kerr cell 68 is used for each objective aperture 66 but, for purposes of clarity in the drawings, the symbols for the Kerr cells 68 have been omitted from Figure 11 and are shown in Figure 10 only. Behind each of the objective apertures 66 is a field lens 69 fitted with a field stop 69a which have the same functions as those of the field lens 34 and field stop 34a described above in connection with Figure 4. The series of edgewise adjacent mirrors 35 shown in Figures 10 and 11 is the same as that described in connection with Figures 3 and 4, and each of the field lenses 69, upon exposure of its respective aperture 66 by a Kerr cell 68, is adapted to flood the series of mirrors 35 with light from the object to be photographed. The mirrors 35 form a series of adjacent virtual images in the direction of the dotted lines 51, 52 and 53, and each of the mirrors 35 is adapted to reflect a virtual image of the object to be photographed to the rotatable reflecting prism 70 as indicated in Figures 10 and 11 by continuations of the broken lines 33, 49 and 50 from the faces 35₄, 35₅ and 35₆ respectively. In the position of the prism 70 shown in Figures 10 and 11, the virtual images reflected from the mirrors 35 are being reflected by the reflecting side 70₁ of the prism 70.

The virtual images reflected by the prism side 70₁ are reflected from a reflector 71 through an objective lens 76 equipped with an aperture stop 76a to another reflector 72. The reflector 72 reflects the light back to a second rotatable prism 73 mounted coaxially with the rotatable prism 70, the prisms being arranged to rotate together at the same speed of rotation. If one of the reflectors 71 or 72 is a room prism or other device for rotating the images through 180°, the images reflected by the prism 73 will be stationary and may be used to expose stationary film. The objective lens 76 is adapted to form real images at the film.

As far as any one objective aperture 66 is concerned, the operation of the system to produce a series of adjacent virtual images at the mirrors 35 for projection singly and successively through the aperture stop 76a is the same as the operation of the system described above with reference to Figures 3 and 4. However, in the case of the system shown in Figures 10 and 11, the Kerr cells are adapted to expose successively the apertures 66₁, 66₂, 66₃, during the time in which, accordingly to the system described in connection with Figures 3 and 4, a single image would be formed on the film. In this way the speed of the camera is increased by the same number of times as the number of objective apertures used and, for example, if ten objective apertures were used in conjunction with a series of twenty adjacent mirrors 35 as shown in Figure 7, the camera could take photographs at a rate as high as five million photographs per second.

Another embodiment of the invention is illustrated in Figure 12. The system shown in Figure 12 is similar to that of Figure 4 with the exception that instead of the multi-sided rotatable prism 37 a single plain rotatable mirror 74 is used. The mirror 74 is rotatable about an axis 75 parallel to the planes of the faces of the mirrors 35. In Figure 12, the mirrors 41 and 43 are part of an optical system for directing the images back to the mirror 74 at a different angle from the angle of their reflection from the mirror 74 to the mirror 39. The images reflected to the rotatable mirror 74 from the mirror 43 are reflected in the directions indicated by the dotted lines 54, 55 and 56 and since the motion imparted to the images upon their first reflection from the rotatable mirror 74 is in effect cancelled by the motion imparted during the second reflection of the images from the rotatable mirror 74, the images may be received along the lines 54, 55 and 56 upon stationary film.

Although the mirrors shown in the drawings are of the plane type, a camera according to the invention may have convex or concave type mirrors. These types have not been shown in the drawings since a persion skilled in the art would have no difficulty in substituting one type for the other after he had considered the embodiments which have been described in detail.

What I claim as my invention is:

1. A camera for taking a succession of pictures of an object comprising at least one objective aperture for admitting light from an object to be photographed, a plurality of image forming elements of which each is arranged to receive light from said objective aperture continuously and simultaneously and to form one of a series of adjacent virtual images of said object, at least one rotatable light reflecting surface arranged to reflect light simultaneously from each of said virtual images and to form a series of moving virtual images remote from said reflecting surface, means for rotating said reflecting surface, an image forming element located to transmit light consecutively from said moving virtual images to form successive moving real images of said object at a location remote from said rotatable light reflecting surface, and means for recording said real images one at a time on photographic film.

2. A camera as defined in claim 1 in which the rotatable light reflecting surface is rotatable about an axis substantially parallel to said reflecting surface.

3. A camera as defined in claim 1 in which the means for recording the moving real images on photographic film comprises a field stop adapted to pass one of said real images at a time, means for reflecting each of said real images passed by said field stop back to the rotatable light reflecting surface, and means for holding the photographic film in the paths along which the real images are again reflected from said rotatable light reflecting surface.

4. A camera as defined in claim 1 comprising a plurality of objective apertures and shutter means for admitting light through said apertures individually in succession during the interval while the rotatable light reflecting surface reflects light from one of the plurality of image forming elements to the film.

5. A camera as defined in claim 1 in which the plurality of image forming elements arranged to be flooded with light from the objective aperture are a plurality of edgewise adjacent plane mirrors inclined to one another so as to produce a series of substantially contiguous virtual images of the object to be photographed.

6. A camera as defined in claim 5 in which the rotatable light reflecting surface is a prism having light reflecting sides, said sides being movable by rotation of the prism to reflect light from each of the virtual images formed by the image forming elements.

7. A camera as defined in claim 6 in which the means for recording the moving real images on photographic film comprises a field stop adapted to pass one of said real images at a time, means for reflecting each of said real images passed by said field stop back to a light reflecting side of the prism, and means for holding photographic film in the paths along which the real images are again reflected from said prism.

8. A camera as defined in claim 7 in which the photographic film is held stationary and the means for recording the real images on film includes two mirrors arranged to reflect successively each real image, said mirrors having the planes of their reflecting sides inclined in opposite directions relative to the axis of rotation of the prism so as to rotate the images a predetermined amount in a predetermined direction about their optical axes before each is reflected for a second time by said prism, said camera comprising a second reflecting surface rotatable about an axis parallel to its surface and arranged to reflect the real images, after they are reflected for the second time by said prism, to the film and thereby to eliminate motion of the images relative to the film while reflecting succeeding series of images to different locations on the film.

9. A camera as defined in claim 8 in which the means for holding the photographic film is adapted to hold a plurality of strips of film in edgewise adjacent relation so that the second reflecting surface reflects each succeeding series of real images to a different strip of film.

10. A camera as defined in claim 5 comprising a plurality of rows of edgewise adjacent plane mirrors arranged in tiers with the mirrors in each tier offset from the mirrors in each other tier.

11. A camera for taking a succession of pictures of an object comprising a plurality of objective apertures for admitting light from an object to be photographed, a plurality of image forming elements arranged to be flooded with light from said objective apertures, each of said image forming elements forming a virtual image for each of said objective apertures, a rotatable light reflecting surface movable by rotation to reflect light from each of said image forming elements and to form a series of remote moving virtual images, means for rotating said reflecting surface, an image forming element located to transmit light from said moving virtual images to form a series of moving real images of said object at a location remote from said rotatable light reflecting surface, and means for recording said real images on photographic film including a light stop adapted to pass one of said moving real images at a time.

12. A camera for taking a succession of pictures of an object, comprising at least one objective aperture for admitting light from an object to be photographed, a plurality of image forming elements of which each is arranged to receive light from said objective aperture continuously and simultaneously and to form one of a series of adjacent virtual images of said object, a first prism having light reflecting sides, said sides being movable by rotation of said first prism so that each reflects light from each of said virtual images and forms a series of moving virtual images remote from said first prism, a second rotatable reflecting prism coaxial and rotatable with said first prism, an image forming element located to transmit light consecutively from said moving virtual images, means for directing said light from said image forming element to said second prism, means for holding photographic film in paths along which light from said second prism is reflected, said image forming element being adapted to form real images at said film.

13. A camera for taking a succession of pictures of an object comprising at least one objective aperture for admitting light from an object to be photographed, a plurality of image forming elements of which each is arranged to receive light from said objective aperture continuously and simultaneously and to form one of a series of adjacent virtual images of said object, at least one rotatable light reflecting surface arranged to reflect light simultaneously from each of said virtual images and to form a series of moving virtual images remote from said reflecting surface, means for rotating said reflecting surface, an image forming element located to transmit light consecutively from said moving virtual images to form successive moving real images of said object at a location remote from said rotatable light reflecting surface so that said real images can then be recorded one at a time on photographic film.

References Cited in the file of this patent

UNITED STATES PATENTS

| Number | Name | Date |
|---|---|---|
| 1,424,886 | Douglass | Aug. 8, 1922 |
| 1,824,469 | Dyche | Sept. 22, 1931 |
| 1,903,204 | Suhara | Mar. 28, 1933 |
| 1,950,374 | Kanolt | Mar. 6, 1934 |
| 2,400,887 | Miller | May 28, 1946 |

FOREIGN PATENTS

| Number | Country | Date |
|---|---|---|
| 611,746 | France | July 17, 1926 |
| 767,716 | France | May 7, 1934 |
| 487,318 | Great Britain | June 13, 1938 |
| 582,637 | Great Britain | Nov. 22, 1946 |